US012194733B2

(12) United States Patent
Kosugi et al.

(10) Patent No.: US 12,194,733 B2
(45) Date of Patent: Jan. 14, 2025

(54) IMAGE FORMING APPARATUS, METHOD FOR CONTROLLING IMAGE FORMING APPARATUS, AND CONTROL PROGRAM FOR IMAGE FORMING APPARATUS

(71) Applicant: KONICA MINOLTA, INC., Tokyo (JP)

(72) Inventors: Akira Kosugi, Tokyo (JP); Shinji Morita, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 84 days.

(21) Appl. No.: 17/990,633

(22) Filed: Nov. 18, 2022

(65) Prior Publication Data

US 2023/0173835 A1 Jun. 8, 2023

(30) Foreign Application Priority Data

Dec. 3, 2021 (JP) ................................ 2021-196785

(51) Int. Cl.
*B41J 11/00* (2006.01)
*B41J 29/377* (2006.01)

(52) U.S. Cl.
CPC ...... *B41J 11/00244* (2021.01); *B41J 11/0015* (2013.01); *B41J 29/377* (2013.01)

(58) Field of Classification Search
CPC .. B41J 11/00244; B41J 11/0015; B41J 29/377
See application file for complete search history.

(56) References Cited

U.S. PATENT DOCUMENTS

2013/0100198 A1* 4/2013 Kanome ............ B41J 11/00214 347/18

FOREIGN PATENT DOCUMENTS

JP 2007-144830 A 6/2007
JP 2016150444 A * 8/2016

* cited by examiner

*Primary Examiner* — Justin Seo
(74) *Attorney, Agent, or Firm* — Squire Patton Boggs (US) LLP

(57) ABSTRACT

An image forming apparatus capable of executing a single-sided recording mode in which an image is recorded on one side of a recording medium and a double-sided recording mode in which an image is recorded on both sides of the recording medium, the image forming apparatus includes: a first temperature adjustment device that adjusts a temperature of the recording medium; an inkjet head that ejects ink onto a surface of the recording medium; a reverse unit that reverses front and back surfaces of the recording medium by switching a conveying direction of the recording medium when the double-sided recording mode is executed; a second temperature adjustment device that controls the temperature of the recording medium in which the front and back surfaces are reversed; and a control device that controls at least one of the first and second temperature adjustment devices.

15 Claims, 9 Drawing Sheets

FIG.5

SHEET TARGET TEMPERATURE

| SHEET SURFACE TARGET TEMPERATURE (°C) | | | SHEET THICKNESS (mm) | | | | | | | | |
|---|---|---|---|---|---|---|---|---|---|---|---|
| | | | 1 | 2 | 3 | 4 | 5 | 6 | 7 | 8 | 9 |
| No. | SHEET TYPE | SHEET LENGTH (mm) | 0.06–0.07 | 0.08–0.09 | 0.10–0.14 | 0.15–0.19 | 0.20–0.29 | 0.30–0.39 | 0.40–0.45 | 0.46–0.49 | 0.50–0.60 |
| 1 | MATT COATED PAPER | 650～750 | 42.0 | 43.0 | 43.0 | 43.0 | 43.0 | 43.0 | 45.0 | 45.0 | 46.0 |
| | | 550～649 | 41.0 | 42.0 | 42.0 | 42.0 | 42.0 | 42.0 | 44.0 | 44.0 | 45.0 |
| | | 400～549 | 40.0 | 41.0 | 41.0 | 41.0 | 41.0 | 41.0 | 43.0 | 43.0 | 44.0 |
| 2 | COATED PAPER | 650～750 | 40.0 | 42.0 | 42.0 | 42.0 | 42.0 | 43.0 | 43.0 | 44.0 | 45.0 |
| | | 550～649 | 39.0 | 41.0 | 41.0 | 41.0 | 41.0 | 42.0 | 42.0 | 43.0 | 44.0 |
| | | 400～549 | 38.0 | 40.0 | 40.0 | 40.0 | 40.0 | 41.0 | 41.0 | 42.0 | 43.0 |
| 3 | HIGH-QUALITY PAPER | 650～750 | 35.0 | 36.0 | 36.0 | 36.0 | 36.0 | 37.0 | 37.0 | 37.0 | 38.0 |
| | | 550～649 | 34.0 | 35.0 | 35.0 | 35.0 | 35.0 | 36.0 | 36.0 | 36.0 | 37.0 |
| | | 400～549 | 33.0 | 34.0 | 34.0 | 34.0 | 34.0 | 35.0 | 35.0 | 35.0 | 36.0 |
| 4 | SYNTHETIC PAPER | 650～750 | 37.0 | 38.0 | 38.0 | 38.0 | 38.0 | 39.0 | 39.0 | 39.0 | 40.0 |
| | | 550～649 | 36.0 | 37.0 | 37.0 | 37.0 | 37.0 | 38.0 | 38.0 | 38.0 | 39.0 |
| | | 400～549 | 35.0 | 36.0 | 36.0 | 36.0 | 36.0 | 37.0 | 37.0 | 37.0 | 38.0 |
| 5 | TRANSPARENT PAPER (PLASTIC PAPER) | 650～750 | – | – | 43.0 | 43.0 | 43.0 | 44.0 | 44.0 | 44.0 | 45.0 |
| | | 550～649 | – | – | 42.0 | 42.0 | 42.0 | 42.0 | 43.0 | 43.0 | 44.0 |
| | | 400～549 | – | – | 41.0 | 41.0 | 41.0 | 41.0 | 42.0 | 42.0 | 43.0 |
| 6 | EMBOSSED PAPER | 650～750 | – | – | 38.0 | 38.0 | 38.0 | 39.0 | 39.0 | 39.0 | 40.0 |
| | | 550～649 | – | – | 37.0 | 37.0 | 37.0 | 38.0 | 38.0 | 38.0 | 39.0 |
| | | 400～549 | – | – | 36.0 | 36.0 | 36.0 | 37.0 | 37.0 | 37.0 | 38.0 |
| 7 | TACK PAPER | 650～750 | – | – | – | 42.0 | 42.0 | – | – | – | – |
| | | 550～649 | – | – | – | 41.0 | 41.0 | – | – | – | – |
| | | 400～549 | – | – | – | 40.0 | 40.0 | – | – | – | – |

IMAGE FORMING APPARATUS, METHOD FOR CONTROLLING IMAGE FORMING APPARATUS, AND CONTROL PROGRAM FOR IMAGE FORMING APPARATUS

The entire disclosure of Japanese Patent Application No. 2021-196785, filed on Dec. 3, 2021, is incorporated herein by reference in its entirety.

BACKGROUND

Technological Field

The present disclosure relates to an image forming apparatus.

Description of the Related Art

Conventionally, in an image forming apparatus using an inkjet system such as a copying machine and a printer, a double-sided recording system in which after an image is formed on one side of a sheet, the sheet is conveyed to an image forming unit again without being ejected and an image is formed on the other side is widely used.

The double-sided recording system image forming apparatus includes a reverser that reverses the sheet on which the image is formed on one side and a re-conveyer that re-conveys the reversed sheet to the image forming unit.

On the other hand, in the double-sided recording system image forming apparatus, it is common that the sheet is reversed using a switchback device to perform recording on both sides. Japanese Laid-Open Patent Publication No. 2016-150444, Japanese Laid-Open Patent Publication No. 2007-144830, and the like disclose a system of maintaining print quality of a front surface and securing the print quality of a back surface.

However, the print quality of the back surface is required to be further improved in the double-sided recording system image forming apparatus.

SUMMARY

The present disclosure has been made in view of the background as described above, and an object of the present disclosure is to provide an image forming apparatus, a method for controlling the image forming apparatus, and a control program for the image forming apparatus capable of improving print quality of a back surface in a double-sided recording system image forming apparatus.

An image forming apparatus of the present disclosure capable of executing a single-sided recording mode in which an image is recorded on one side of a recording medium and a double-sided recording mode in which an image is recorded on both sides of the recording medium, the image forming apparatus includes: a first temperature adjustment device that adjusts a temperature of the recording medium; an inkjet head that ejects ink onto a surface of the recording medium; a reverse unit that reverses front and back surfaces of the recording medium by switching a conveying direction of the recording medium when the double-sided recording mode is executed; a second temperature adjustment device that controls the temperature of the recording medium in which the front and back surfaces are reversed; and a control device that controls at least one of the first and second temperature adjustment devices.

Preferably, the second temperature adjustment device is provided between the reverse unit and the inkjet head.

Preferably, the control device adjusts the temperature of the recording medium by the first and second temperature adjustment devices based on a temperature table associated with a type and a thickness of the recording medium.

Preferably, the image forming apparatus further includes a sheet alignment unit that is provided between the first temperature adjustment device and the inkjet head to adjust a position of the recording medium, and the second temperature adjustment device conveys the recording medium to the sheet alignment unit.

Preferably, the sheet alignment unit includes a third temperature adjustment device that adjusts the temperature of the recording medium.

Preferably, the sheet alignment unit includes a cooling fan.

Preferably, the second temperature adjustment device includes: a plurality of roller pairs that convey the recording medium while adjusting the temperature of the recording medium; and a drive mechanism that adjusts a nip width of each of the plurality of roller pairs.

Preferably, the control device selects the roller pair to be used from the plurality of roller pairs by controlling the drive mechanism.

Preferably, the control device adjusts the nip width of at least one roller pair of the plurality of roller pairs by controlling the drive mechanism.

Preferably, the second temperature adjustment device includes: a roller pair that conveys the recording medium while adjusting the temperature of the recording medium; a first heater provided corresponding to a central portion of the roller pair; and a second heater provided corresponding to an end portion of the roller pair.

Preferably, the control device drives at least one of the first and second heaters according to a sheet width of the recording medium.

Preferably, the image forming apparatus further includes a temperature sensor provided on at least one of upstream and downstream of the second temperature adjustment device.

Preferably, the image forming apparatus further includes an irradiation unit that irradiates the ink ejected onto the surface of the recording medium with ultraviolet light. The ink is a UV ink that is cured by the ultraviolet light.

In a method for controlling an image forming apparatus of the present disclosure capable of executing a single-sided recording mode in which an image is recorded on one side of a recording medium and a double-sided recording mode in which an image is recorded on both sides of the recording medium, the method includes: adjusting a temperature of the recording medium; ejecting ink onto a surface of the recording medium; reversing front and back surfaces of the recording medium by switching a conveying direction of the recording medium when the double-sided recording mode is executed; and adjusting the temperature of the recording medium in which front and back surfaces are reversed.

In a control program for an image forming apparatus of the present disclosure capable of executing a single-sided recording mode in which image recording is performed on one side of a recording medium and a double-sided recording mode in which image recording is performed on both sides of the recording medium, the control program, when executed by a computer of the image forming apparatus, causes the computer to perform processing including: adjusting a temperature of the recording medium; ejecting ink onto a surface of the recording medium; reversing front and back surfaces of the recording medium by switching a conveying direction of the recording medium when the double-sided recording mode is executed; and adjusting the temperature of the recording medium in which front and back surfaces are reversed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a view illustrating a sheet heating table of the first embodiment.

DETAILED DESCRIPTION OF EMBODIMENTS

Figure 1:
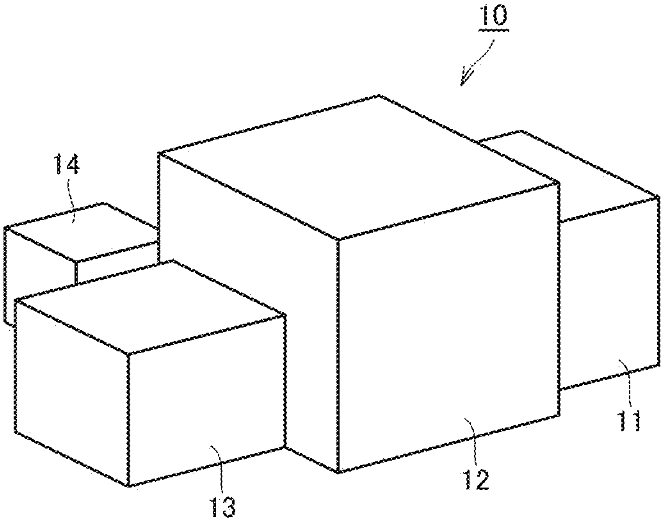
FIG. 1 is a view schematically illustrating an overall configuration of an image forming apparatus 10 according to a first embodiment.

Hereinafter, one or more embodiments of the present invention will be described with reference to the drawings. However, the scope of the invention is not limited to the disclosed embodiments.

With reference to the drawings, embodiments will be described below. In the following description, the same components and constituents are denoted by the same reference numerals. Those names and functions are the same. Thus, the detailed description thereof will not be repeated. The following embodiments and modifications described below may selectively be combined as appropriate.

In the following embodiments, for example, an MFP and a printer can be cited as the image forming apparatus.

First Embodiment

FIG. 1 is a view schematically illustrating an overall configuration of an image forming apparatus 10 according to a first embodiment. With reference to FIG. 1, image forming apparatus 10 is an inkjet recording apparatus that forms (records) an image on a sheet by ejecting ink from a plurality of nozzles. Image forming apparatus 10 may be a color image forming apparatus or a monochrome image forming apparatus. In the present embodiment, a case where image forming apparatus 10 is the color image forming apparatus will be described as an example. Image forming apparatus 10 is an apparatus that forms the image on the sheet by a one-pass system inkjet system. The one-pass inkjet system is a system of forming the image without moving a recording head unit having the plurality of nozzles in a main scanning direction. The main scanning direction is a direction orthogonal to a sub-scanning direction. The sub-scanning direction is a direction parallel to a sheet conveying direction. The one-pass inkjet system can form the image in a non-contact manner with a recording medium at high speed.

Image forming apparatus 10 includes a sheet feeder 11, an image forming unit 12, a sheet ejector 13, and an ink supply tank 14. Sheet feeder 11 is a portion that supplies the sheet as the recording medium. Image forming unit 12 is a portion that forms the image on the sheet using ink. Sheet ejector 13 is a portion that ejects the sheet on which image formation is completed. Ink supply tank 14 is a tank that stores a predetermined amount of ink and supplies the ink to image forming unit 12.

Figure 2:
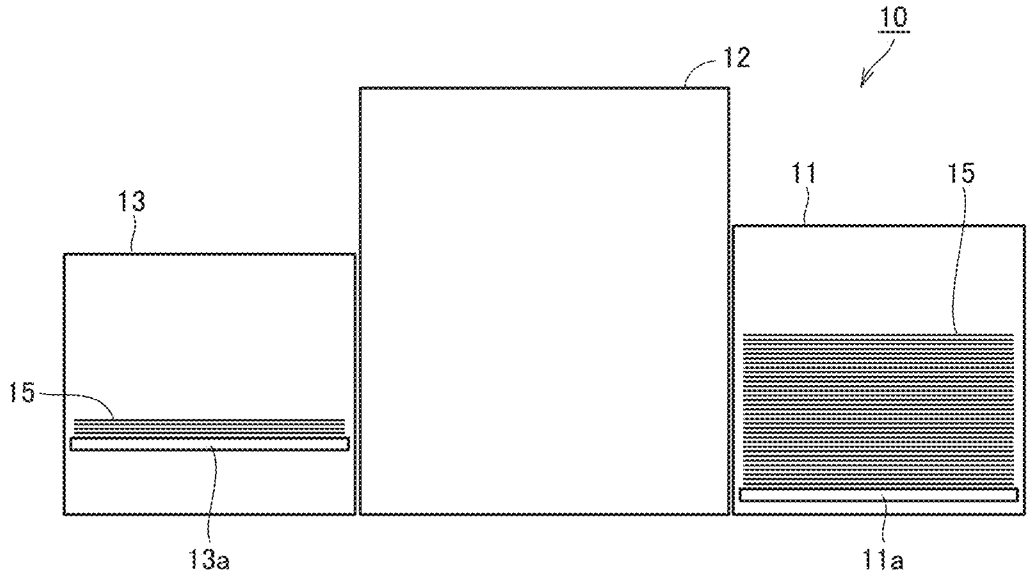
FIG. 2 is a schematic side view illustrating an internal structure of the image forming apparatus 10 of the first embodiment.

FIG. 2 is a schematic side view illustrating an internal structure of image forming apparatus 10 of the first embodiment. With reference to FIG. 2, sheet feeder 11 includes a sheet feed tray 11*a*. A sheet 15 before the image is formed is stacked in sheet feed tray 11*a*. Sheet feeder 11 separates and supplies sheets 15 stacked on sheet feed tray 11*a* one by one in order from the top. Details of image forming unit 12 will be described later. A plurality of recording head units are provided in image forming unit 12, and form (record) the image on sheet 15 serving as the recording medium using the ink of a color corresponding to each recording medium. In the present embodiment, an ultraviolet curable ink (UV ink) is used as an example. Sheet ejector 13 includes a sheet ejection tray 13*a*. Sheet 15 on which the image formation is completed is sequentially ejected to sheet ejection tray 13*a*.

Figure 3:
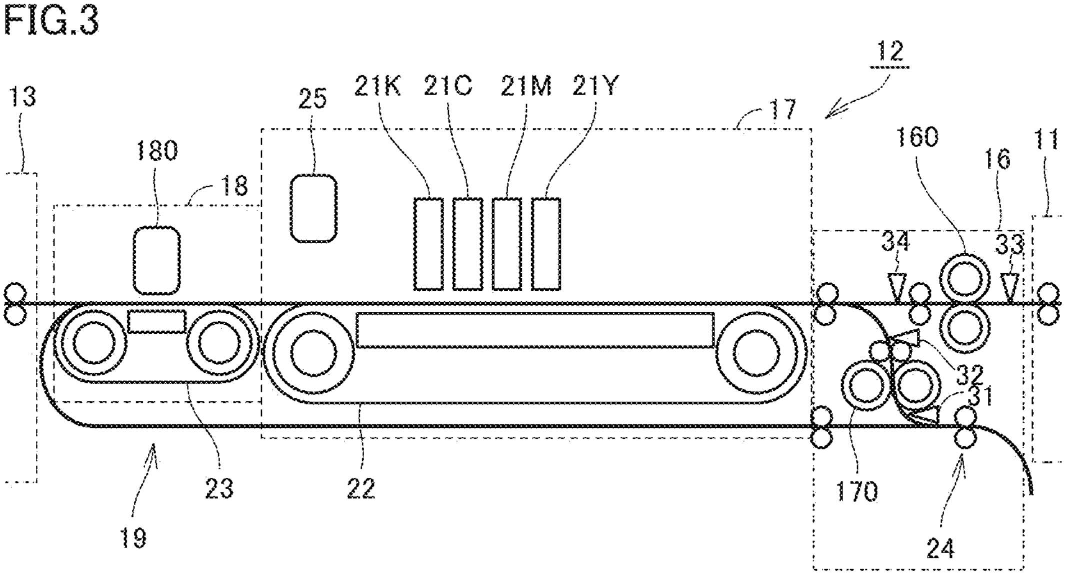
FIG. 3 is a schematic side view of an image forming unit 12 of the first embodiment.

FIG. 3 is a schematic side view of image forming unit 12 of the first embodiment. With reference to FIG. 3, image forming unit 12 includes a conveyance unit 16, a printing unit 17, an irradiation unit 18, and a back surface conveyance path 19.

Conveyance unit 16 conveys sheet 15 to printing unit 17. Conveyance unit 16 includes a reverse unit 24.

Reverse unit 24 reverses the front surface and the back surface of the sheet conveyed from back surface conveyance path 19 and conveys the sheet to printing unit 17.

Printing unit 17 executes printing processing on conveyed sheet 15.

Irradiation unit 18 irradiates printed sheet 15 with ultraviolet light.

Back surface conveyance path 19 conveys sheet 15 to reverse unit 24 in order to perform the printing on the back surface in the double-sided recording system.

Conveyance unit 16 includes a first temperature adjustment device 160 and a second temperature adjustment device 170.

First temperature adjustment device 160 conveys sheet 15 to printing unit 17 and adjusts temperature of the sheet. Specifically, first temperature adjustment device 160 includes a heater as a heat source, and adjusts the temperature of sheet 15 by adjusting the temperature of the heater.

Temperature sensors are provided upstream and downstream of first temperature adjustment device 160.

As an example, temperature sensors 33, 34 are provided upstream and downstream of first temperature adjustment device 160. Temperature sensor 33 detects the temperature of sheet 15 upstream of first temperature adjustment device 160. Temperature sensor 34 detects the temperature of sheet 15 downstream of first temperature adjustment device 160.

Second temperature adjustment device 170 conveys sheet 15 reversed and conveyed by reverse unit 24 to printing unit 17, and adjusts the temperature of the sheet. Specifically, second temperature adjustment device 170 includes a heater as a heat source, and adjusts the temperature of sheet 15 by adjusting the temperature of the heater.

Second temperature adjustment device 170 is provided between printing unit 17 and reverse unit 24.

Temperature sensors are provided upstream and downstream of second temperature adjustment device 170. As an example, temperature sensors 31, 32 are provided upstream and downstream of second temperature adjustment device 170. Temperature sensor 31 detects the temperature of sheet 15 upstream of second temperature adjustment device 170. Temperature sensor 32 detects the temperature of sheet 15 downstream of second temperature adjustment device 170.

Printing unit 17 includes a plurality of recording head units 21, a loop-shaped conveyance belt 22, and a mist catcher 25. Specifically, each of recording head units 21Y, 21M, 21C, 21K is disposed on an upper side of conveyance belt 22 and disposed while being opposite to conveyance belt 22. Each of recording head units 21Y, 21M, 21C, 21K is disposed to be shifted in position in a traveling direction of conveyance belt 22. In the present embodiment, as an example, recording head unit 21Y forms the image using yellow (Y) ink, and recording head unit 21M forms the image using magenta (M) ink. Recording head unit 21C forms the image using cyan (C) ink, and recording head unit 21K forms the image using black (K) ink. In the following description, suffixes of Y, M, C, K representing the color of the ink are omitted unless each of the recording head units 21Y, 21M, 21C, 21K and the components thereof by the color of the ink are required to be distinguished from each other.

Mist catcher 25 is disposed on the downstream side of recording head unit 21K in the conveying direction of sheet 15 by conveyance belt 22. Mist catcher 25 collects mist generated by the ejection of the ink from the inkjet head provided in each of recording head units 21Y, 21M, 21C, 21K.

Printing unit 17 conveys sheet 15 by rotation of loop-shaped conveyance belt 22. Sheet 15 as the recording medium is conveyed according to conveyance belt 22. Thus, image recording positions by recording head units 21Y, 21M, 21C, 21K exist in a middle of the conveyance path. When sheet 15 is conveyed along the conveyance path, a leading end of sheet 15 first passes through the image recording position by recording head unit 21Y, and then sequentially passes through the image recording positions by other recording head units 21M, 21C, and 21K. When the inks are discharged from four recording head units 21Y, 21M, 21C, 21K at predetermined timings, the yellow ink adheres to sheet 15 at the image recording position, and the magenta ink adheres to sheet 15 at the image recording position. Furthermore, the cyan ink adheres to sheet 15 at the image recording position, and the black ink adheres to sheet 15 at the image recording position.

An image forming surface of sheet 15 refers to a surface of sheet 15 opposite to each of recording head units 21Y, 21M, 21C, 21K when sheet 15 is conveyed using conveyance belt 22. The image is formed on the image forming surface of sheet 15 using each of the recording head units 21Y, 21M, 21C, 21K.

Irradiation unit 18 includes an ultraviolet irradiation device 180 and a loop-shaped conveyance belt 23. Conveyance belt 23 conveys sheet 15 conveyed from conveyance belt 22 to ultraviolet irradiation device 180. Ultraviolet irradiation device 180 is disposed on the downstream side of mist catcher 25 in the conveying direction of sheet 15. Ultraviolet irradiation device 180 irradiates sheet 15 conveyed by the rotation of conveyance belt 23 with ultraviolet light to cure the ink on sheet 15. The ink on sheet 15 described here refers to ink forming the image on sheet 15.

Irradiation unit 18 functions as a fixing unit that fixes the image formed on sheet 15 using the ink onto sheet 15. The fixing of the image by the fixing unit is not limited to the one that irradiates the ultraviolet light, and may be one that irradiates an energy ray capable of curing the ink according to a property of the ink, one that heats sheet 15 to dry the ink, or the like.

In the case of the double-sided recording system in which the image recording is performed on both sides of sheet 15, sheet 15 is conveyed to back surface conveyance path 19. Back surface conveyance path 19 conveys sheet 15 to reverse unit 24. Reverse unit (switchback device) 24 is a portion that reverses the front and back of sheet 15 in order to form the images on both sides of sheet 15.

Figure 4:
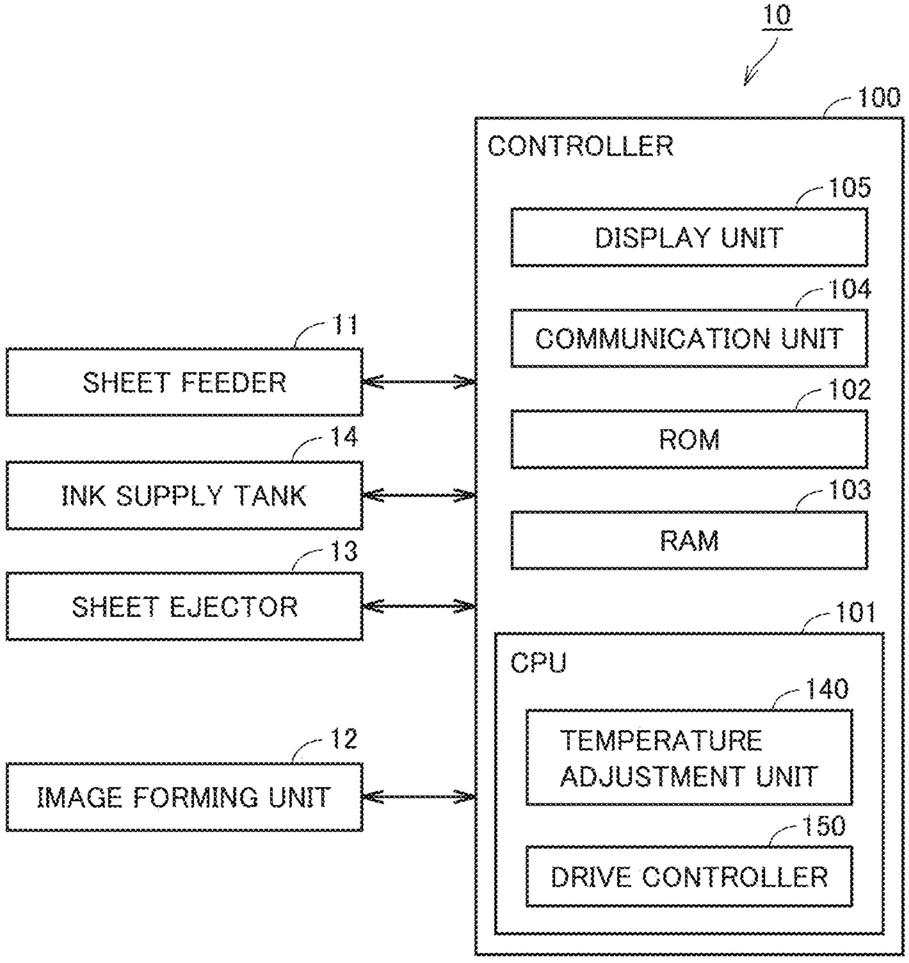
FIG. 4 is a functional block diagram illustrating the image forming apparatus 10 of the first embodiment.

FIG. 4 is a functional block diagram illustrating image forming apparatus 10 of the first embodiment. With reference to FIG. 4, image forming apparatus 10 includes sheet feeder 11, ink supply tank 14, sheet ejector 13, image forming unit 12, and a controller 100.

Controller 100 includes a central processing unit (CPU) 101, a read only memory (ROM) 102, a random access memory (RAM) 103, and a communication unit 104.

CPU 101 reads a program corresponding to a processing content from ROM 102, develops the program in RAM 103, and centrally controls the operation of each block of image forming apparatus 10 in cooperation with the developed program.

For example, ROM 102 and RAM 103 include a non-volatile semiconductor memory (what is called a flash memory) or a hard disk drive.

ROM 102 and RAM 103 store the program executed by CPU 101 and various data used for executing the program. At least one of the program and the data may be stored in a storage device (an external server or the like) other than controller 100 as long as the storage device can be accessed by CPU 101.

The processing in controller 100 is implemented by each piece of hardware and software executed by controller 100. Sometimes such the software may be previously stored in ROM 102 and RAM 103. The software may be stored in CD-ROM or another recording medium and distributed as a computer program. Alternatively, the software may be provided as an application program that can be downloaded by an information provider connected to what is called the Internet. Such the software is read from the recording medium by an optical disk drive device or another reading device, or downloaded through communication unit 104 and then temporarily stored in RAM 103. The software is read from RAM 103 by CPU 101 and stored in RAM 103 in the form of an executable program. Controller 100 executes the program.

Controller 100 transmits and receives various data to and from an external device (for example, a personal computer or an external server) connected to a communication network such as a local area network (LAN) or a wide area network (WAN) through communication unit 104. For example, controller 100 receives image data transmitted from the external device, and forms the image on sheet 15 based on the image data (input image data). For example, communication unit 104 includes a communication control card such as a LAN card.

CPU 101 implements various functional blocks by reading and executing the program. Specifically, CPU 101 includes a temperature adjustment unit 140 and a drive controller 150.

The temperature adjustment unit 140 controls at least one of first temperature adjustment device 160 and second temperature adjustment device 170. Temperature adjustment unit 140 may control at least one of first temperature adjustment device 160 and second temperature adjustment device 170 based on temperature information detected by temperature sensors 31 to 34.

Drive controller 150 controls a drive mechanism described later.

FIG. 5 is a view illustrating a sheet heating table of the first embodiment. With reference to FIG. 5, in this example, the sheet surface target temperature to be adjusted according to a sheet type, a sheet length, and a sheet thickness in the case of using the UV ink is illustrated as an example. Specifically, "matt coated paper", "coated paper", "high-quality paper", "synthetic paper", "transparent paper (plastic paper)", embossed paper", and "tack paper" are indicated as the sheet type. In addition, "450 mm to 549 mm", "550 mm to 649 mm", and "650 mm to 750 mm" are indicated as the sheet length. In addition, "0.06 mm to 0.07 mm", 0.08 mm to 0.09 mm", "0.10 mm to 0.14 mm", "0.15 to 0.19 mm", "0.20 mm to 0.29 mm", "0.30 mm to 0.39 mm", "0.40 mm to 0.45 mm", "0.46 mm to 0.49 mm", and "0.50 mm to 0.60 mm" are illustrated as the sheet thickness.

As illustrated in the drawing, the target temperature of sheet 15 is required to be set to around 40° C.

Temperature adjustment unit 140 may acquire the pieces of sheet information about the sheet type, sheet length, and sheet thickness of sheet 15 to be printed, and adjust first temperature adjustment device 160 and second temperature adjustment device 170 based on the sheet information and the heating table in FIG. 5. The pieces of sheet information may be acquired based on information input according to the operation input of the user, or may be acquired from, for example, information stored previously in RAM 103 or the like. The heating table is stored in a memory such as ROM 102 or RAM 103. The pieces of information about the sheet type, the sheet length, and the sheet thickness of sheet 15 has been described as the sheet information. However, one of the pieces of information may be used, or other information may be added.

For example, when acquiring the pieces of sheet information about the sheet type of sheet 15 to be printed as "matt coated paper", the sheet length as "400 mm to 549 mm", and the sheet thickness as "0.06 mm to 0.07 mm", temperature adjustment unit 140 adjusts the temperature of the heater to be heated by first temperature adjustment device 160 such that the temperature of sheet 15 becomes 40° C. In the double-sided recording system, when the printing is performed on the back surface, the temperature of the heater of second temperature adjustment device 170 is adjusted such that the temperature at the time of the printing on the back surface of sheet 15 is 40° C. The temperature of the heater may be adjusted based on the temperature information detected by temperature sensors 31, 32.

Conventionally, the temperature of sheet 15 has been adjusted only by first temperature adjustment device 160 of conveyance unit 16.

However, when sheet 15 is moved to the image recording position of each of the plurality of recording head units 21 through conveyance belt 22, there is a possibility that the temperature decreases gradually. Further, in the double-sided recording system image forming apparatus, because the temperature of sheet 15 decreases when passing through back surface conveyance path 19, there is also a possibility that a gap of the temperature of sheet 15 increases between when the front surface is printed and when the back surface is printed.

In the first embodiment, second temperature adjustment device 170 is provided to heat the sheet passing through back surface conveyance path 19.

With this configuration, sheet 15 is heated by second temperature adjustment device 170, so that a decrease in the temperature of sheet 15 can be prevented at the time of the printing on the back surface. Accordingly, the print quality can be maintained by preventing the temperature decrease when sheet 15 is moved to each image recording position of the plurality of recording head units 21 through conveyance belt 22.

Second Embodiment

Figure 6A:
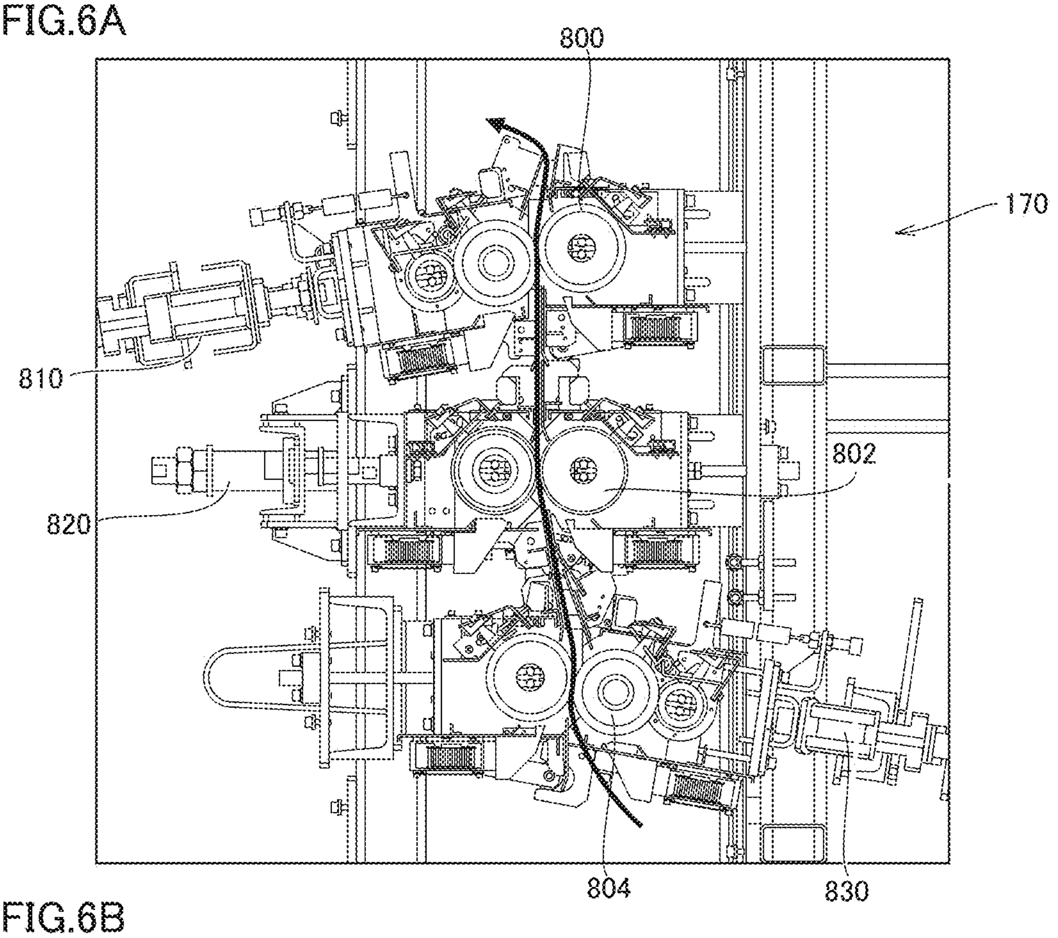
FIGS. 6A and 6B are views illustrating a configuration of a second temperature adjustment device 170 according to a second embodiment.
Figure 6B:
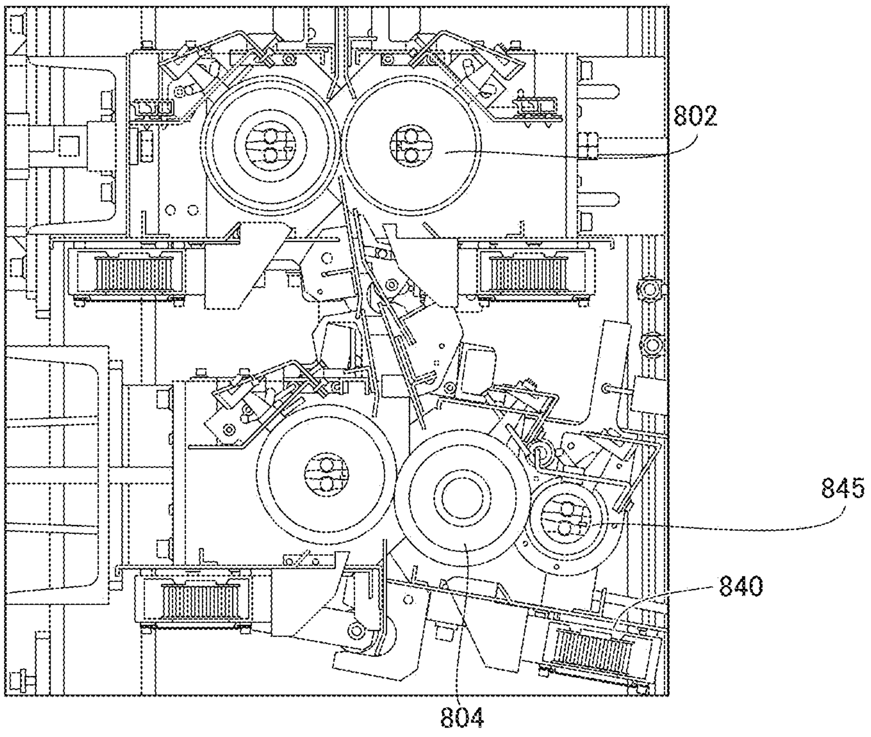

FIGS. 6A and 6B are views illustrating a configuration of a second temperature adjustment device 170 according to a second embodiment.

With reference to FIG. 6A, three roller pairs 800, 820, 804 are included.

Drive mechanisms 810, 820, 830 (air cylinders) that adjust a nip width together with pressing or releasing of the roller pair are provided in three roller pairs 800 to 804.

The heating can be adjusted by adjusting the nip width of the roller pair by drive mechanisms 810 to 830.

With reference to FIG. 6B, a fan is provided corresponding to each of roller pairs 800 to 804. As an example, a fan 840 is provided corresponding to roller pair 804. The same applies to the configuration of other roller pairs.

A heater may be provided inside roller pairs 800 to 804, or heating may be performed by a heat roller that is in direct contact with the roller surface.

As an example, in roller pair 802, a rubber layer is provided as a thin roller pair, and a heater can be provided inside the roller pair. Roller pair 804 may be provided as a roller pair having a thick rubber layer, and a heat roller 845 may be provided to bring the rubber layer and heat roller 845 into contact with each other to adjust the heating.

For example, drive controller 150 controls drive mechanisms 810, 820, 830.

Drive controller 150 may adjust drive mechanisms 810, 820, 830 by a heating amount to heat sheet 15 using all three roller pairs, or may heat sheet 15 using one roller pair. A heating level can be adjusted by adjusting the nip width of the roller pair.

In this example, the temperature can be uniformly adjusted in the conveying direction of sheet 15 by heating at each position using three roller pairs.

Figure 7A:
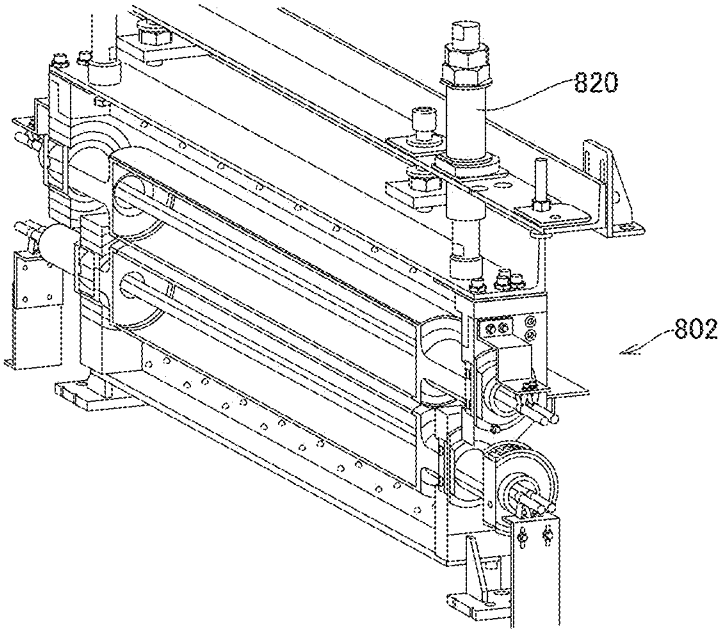
FIGS. 7A to 7C are views illustrating an internal state of a roller pair 802 of the second embodiment.
Figure 7B:
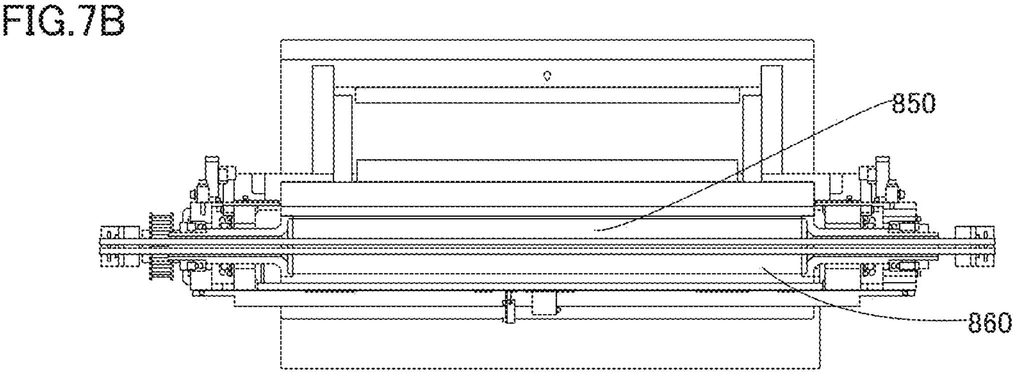
Figure 7C:
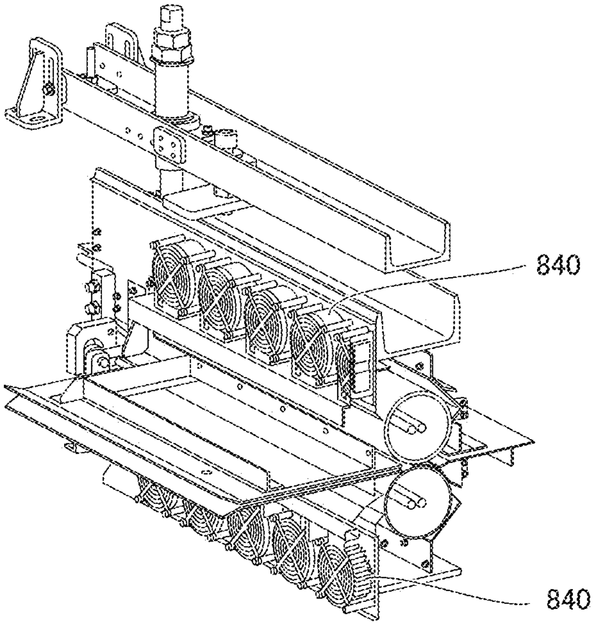

FIGS. 7A to 7C are views illustrating the internal state of roller pair 802 of the second embodiment.

With reference to FIG. 7A, the internal state of roller pair 802 is illustrated. As described above, drive mechanism 820 (air cylinder) is provided in roller pair 802, and the nip width can be adjusted together with the pressing or release of the roller pair.

With reference to FIG. 7B, an upper heater 850 that heats the central portion of the sheet and a lower heater 860 that heats the end portion of the sheet are provided.

As an example, only upper heater 850 can be operated when the sheet size of sheet 15 is small, and upper heater 850 and lower heater 860 can be operated when the sheet size of sheet 15 is large.

With reference to FIG. 7C, fans 840 are provided on both sides corresponding to the roller pair. The excessively increased temperature can be lowered by providing fan 840. Furthermore, the temperature may be finely adjusted by adjusting a rotational speed of fan 840.

In this example, upper heater 850 that heats the central portion of the sheet and lower heater 860 that heats the end portion of the sheet are provided. Furthermore, temperature sensors are provided corresponding to the central portion and the end portion of the sheet of the roller pair, and the temperatures of upper heater 850 and lower heater 860 are adjusted based on the detection results of the respective temperature sensors.

With this configuration, the temperature can be uniformly adjusted in the width direction orthogonal to the conveying direction of sheet 15.

Although roller pair 802 has been described in this example, other roller pairs can have the same configuration.

Third Embodiment

Figure 8:
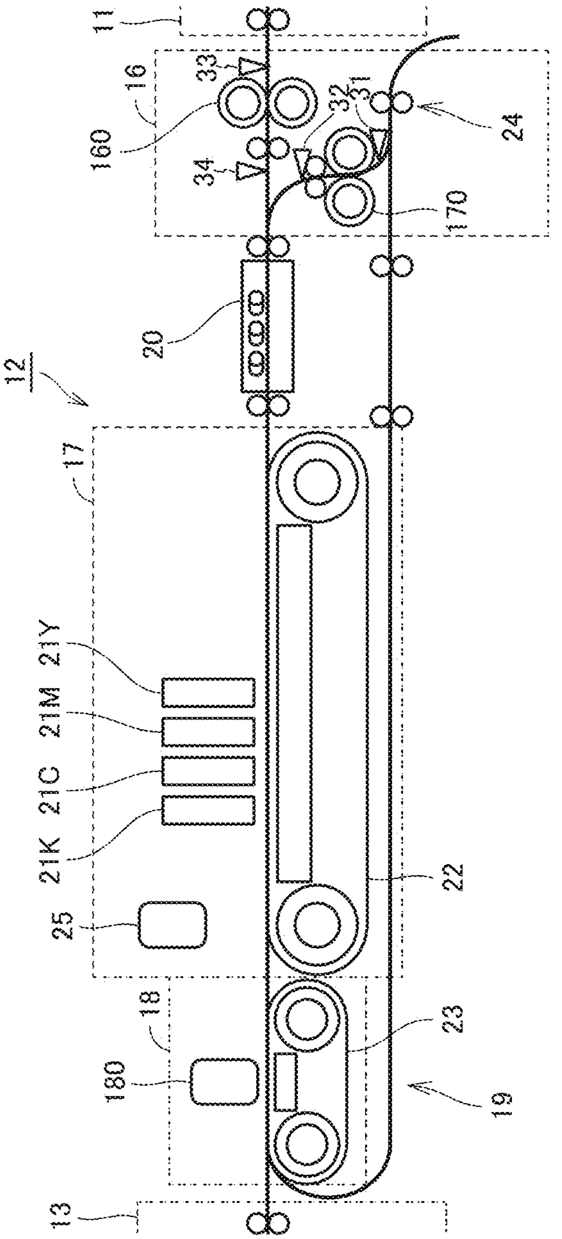
FIG. 8 is a schematic side view illustrating an image forming unit 12 according to a third embodiment.

FIG. 8 is a schematic side view illustrating an image forming unit 12 according to a third embodiment. With reference to FIG. 8, a difference from the configuration in FIG. 3 is that a sheet alignment unit 20 is further provided between conveyance unit 16 and printing unit 17. Sheet alignment unit 20 is a device that adjusts the position (orientation or the like) of sheet 15.

Because other configurations are similar, the detailed description thereof will not be repeated.

FIGS. 9A to 9E are views illustrating the configuration of sheet alignment unit 20 of the third embodiment.

Figure 9A:
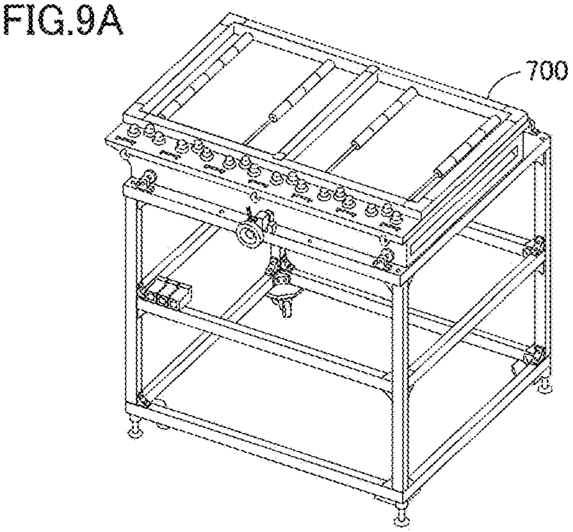
FIGS. 9A to 9E are views illustrating a configuration of a sheet alignment unit 20 of the third embodiment.

With reference to FIG. 9A, sheet alignment unit 20 has a structure covered with a casing 700, and adjusts the position (orientation) and the like of sheet 15 inside.

Figure 9B:
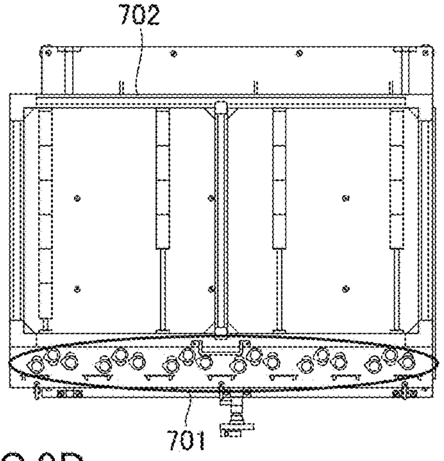

With reference to FIG. 9B, a top view is illustrated. An upper cover 702 that can be opened and closed is provided on an upper surface of casing 700. In this example, upper cover 702 provided on the upper surface so as to be openable and closable to the left and right is provided. Further, a skew roller unit 701 that drives a skew belt 703 is provided to adjust the position of sheet 15 conveyed to sheet alignment unit 20.

Figure 9C:
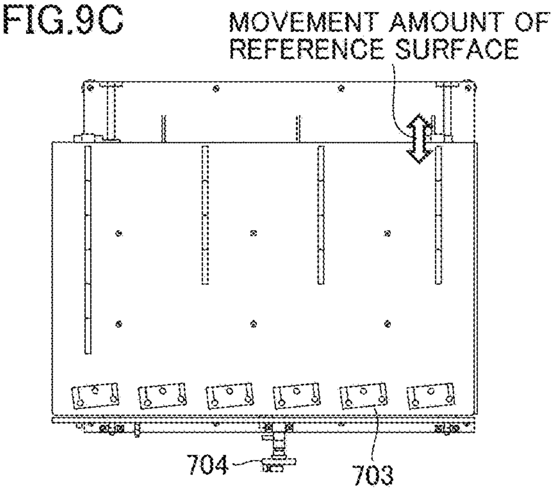

With reference to FIG. 9C, a reference surface is provided to be movable according to the sheet size of sheet 15. In this example, a handle 704 capable of moving the reference surface is provided. A drive mechanism moving the reference surface may be provided instead of handle 704 to automatically adjust a movement amount of the reference surface. Skew belt 703 adjusting the position of sheet 15 is illustrated.

Figure 9D:
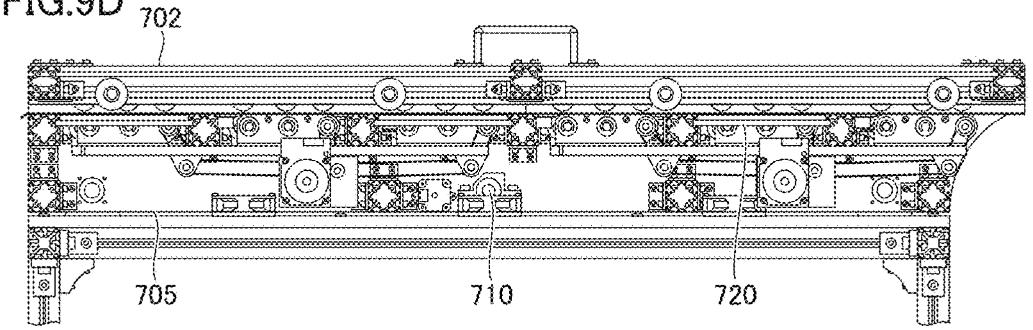

With reference to FIG. 9D, a sectional structure in the conveying direction of sheet alignment unit 20 is illustrated. Sheet 15 passes from the right side and is discharged to the left side. Sheet alignment unit 20 includes upper cover 702 and a lower cover 705. Sheet alignment unit 20 includes a fan 710 and a third temperature adjustment device 720. Third temperature adjustment device 720 includes a heater as a heat source, and temperature adjustment unit 140 adjusts the temperature of sheet 15 by adjusting the temperature of the heater. Temperature sensors may be provided upstream and downstream of sheet alignment unit 20, and temperature adjustment unit 140 may adjust the temperature of the heater based on the detection results of the temperature sensors.

Figure 9E:
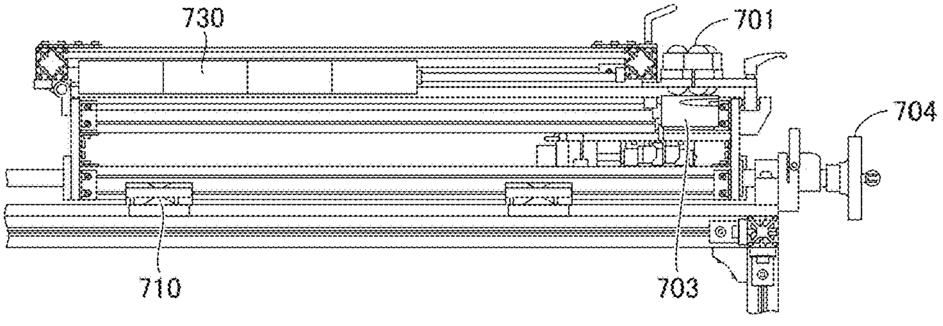

With reference to FIG. 9E, the sectional structure of sheet alignment unit 20 in the width direction orthogonal to the conveying direction is illustrated. In this example, a roller 730 that prevents floating of sheet 15 is provided on the upper surface. Fan 710 is provided in the lower portion.

The temperature of sheet 15 can be adjusted to an appropriate temperature by providing third temperature adjustment device 720 in addition to the adjustment of the heating of sheet 15 by first temperature adjustment device 160 and second temperature adjustment device 170.

Appendix

The above embodiments include the following technical ideas.

[Configuration 1]

An image forming apparatus (10) capable of executing a single-sided recording mode in which an image is recorded on one side of a recording medium and a double-sided recording mode in which an image is recorded on both sides of the recording medium, the image forming apparatus including:

- a first temperature adjustment device (160) that adjusts a temperature of the recording medium;
- an inkjet head (21K, 21C, 21M, 21Z) that ejects ink onto a surface of the recording medium;
- a reverse unit (24) that reverses front and back surfaces of the recording medium by switching a conveying direction of the recording medium when the double-sided recording mode is executed;
- a second temperature adjustment device (170) that controls the temperature of the recording medium in which the front and back surfaces are reversed; and
- a control device (100) that controls at least one of the first and second temperature adjustment devices.

[Configuration 2]

The image forming apparatus according to claim 1, wherein the second temperature adjustment device is provided between the reverse unit and the inkjet head.

[Configuration 3]

The image forming apparatus according to claim 1 or 2, wherein the control device adjusts the temperature of the recording medium by the first and second temperature adjustment devices based on a temperature table associated with a type and a thickness of the recording medium.

[Configuration 4]

The image forming apparatus according to any one of claims 1 to 3, further including a sheet alignment unit (20) that is provided between the first temperature adjustment device and the inkjet head to adjust a position of the recording medium, wherein the second temperature adjustment device conveys the recording medium to the sheet alignment unit.

[Configuration 5]

The image forming apparatus according to claim 4, wherein the sheet alignment unit includes a third temperature adjustment device (720) that adjusts the temperature of the recording medium.

[Configuration 6]

The image forming apparatus according to claim 5, wherein the sheet alignment unit includes a cooling fan (710).

[Configuration 7]

The image forming apparatus according to any one of claims 1 to 6, wherein the second temperature adjustment device includes:

- a plurality of roller pairs (800 to 804) that convey the recording medium while adjusting the temperature of the recording medium; and
- a drive mechanism (810 to 830) that adjusts a nip width of each of the plurality of roller pairs.

[Configuration 8]

The image forming apparatus according to claim 7, wherein the control device selects the roller pair to be used from the plurality of roller pairs by controlling the drive mechanism.

[Configuration 9]

The image forming apparatus according to claim 7, wherein the control device adjusts the nip width of at least one roller pair of the plurality of roller pairs by controlling the drive mechanism.

[Configuration 10]

The image forming apparatus according to any one of claims 1 to 9, wherein the second temperature adjustment device includes:

a roller pair (802) that conveys the recording medium while adjusting the temperature of the recording medium;

a first heater (850) provided corresponding to a central portion of the roller pair; and a second heater (860) provided corresponding to an end portion of the roller pair.

[Configuration 11]

The image forming apparatus according to claim 10, wherein the control device drives at least one of the first and second heaters according to a sheet width of the recording medium.

[Configuration 12]

The image forming apparatus according to any one of claims 1 to 11, further including a temperature sensor (31, 32) provided on at least one of upstream and downstream of the second temperature adjustment device.

[Configuration 13]

The image forming apparatus according to any one of claims 1 to 12, further including an irradiation unit (18) that irradiates ink ejected onto the surface of the recording medium with ultraviolet light, wherein the ink is a UV ink cured by the ultraviolet light.

[Configuration 14]

A method for controlling an image forming apparatus capable of executing a single-sided recording mode in which an image is recorded on one side of a recording medium and a double-sided recording mode in which an image is recorded on both sides of the recording medium, the method including:

adjusting a temperature of the recording medium;

ejecting ink onto a surface of the recording medium;

reversing front and back surfaces of the recording medium by switching a conveying direction of the recording medium when the double-sided recording mode is executed; and adjusting the temperature of the recording medium in which front and back surfaces are reversed.

[Configuration 15]

A control program for an image forming apparatus capable of executing a single-sided recording mode in which image recording is performed on one side of a recording medium and a double-sided recording mode in which image recording is performed on both sides of the recording medium, the control program, when executed by a computer of the image forming apparatus, causing the computer to perform processing including:

adjusting a temperature of the recording medium;

ejecting ink onto a surface of the recording medium;

reversing front and back surfaces of the recording medium by switching a conveying direction of the recording medium when the double-sided recording mode is executed; and adjusting the temperature of the recording medium in which front and back surfaces are reversed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus capable of executing a single-sided recording mode in which an image is recorded on one side of a recording medium and a double-sided recording mode in which an image is recorded on both sides of the recording medium, the image forming apparatus comprising:

a first temperature adjustment device that heats the recording medium immediately before ejecting ink onto the recording medium;

an inkjet head that ejects ink onto a surface of the recording medium;

a reverse unit that reverses front and back surfaces of the recording medium by switching a conveying direction of the recording medium when the double-sided recording mode is executed;

a second temperature adjustment device that heats the recording medium in which the front and back surfaces are reversed, and the second temperature adjustment device is configured to convey the recording medium to the inkjet head; and a control device that controls at least one of the first and second temperature adjustment devices.

2. The image forming apparatus according to claim 1, wherein the second temperature adjustment device is provided between the reverse unit and the inkjet head.

3. The image forming apparatus according to claim 1, wherein the control device adjusts the temperature of the recording medium by the first and second temperature adjustment devices based on a temperature table associated with a type and a thickness of the recording medium.

4. The image forming apparatus according to claim 1, further comprising a sheet alignment unit that is provided between the first temperature adjustment device and the inkjet head to adjust a position of the recording medium, wherein the second temperature adjustment device conveys the recording medium to the sheet alignment unit.

5. The image forming apparatus according to claim 4, wherein the sheet alignment unit includes a third temperature adjustment device that adjusts the temperature of the recording medium.

6. The image forming apparatus according to claim 5, wherein the third temperature adjustment device includes a cooling fan.

7. The image forming apparatus according to claim 1, wherein the second temperature adjustment device includes:

a plurality of roller pairs that convey the recording medium while adjusting the temperature of the recording medium; and a drive mechanism that adjusts a nip width of each of the plurality of roller pairs.

8. The image forming apparatus according to claim 7, wherein the control device selects the roller pair to be used from the plurality of roller pairs by controlling the drive mechanism.

9. The image forming apparatus according to claim 7, wherein the control device adjusts the nip width of at least one roller pair of the plurality of roller pairs by controlling the drive mechanism.

10. The image forming apparatus according to claim 1, wherein the second temperature adjustment device includes:

a roller pair that conveys the recording medium while adjusting the temperature of the recording medium;

a first heater provided corresponding to a central portion of the roller pair; and a second heater provided corresponding to an end portion of the roller pair.

11. The image forming apparatus according to claim 10, wherein the control device drives at least one of the first and second heaters according to a sheet width of the recording medium.

12. The image forming apparatus according to claim 1, further comprising a temperature sensor provided on at least one of upstream and downstream of the second temperature adjustment device.

13. The image forming apparatus according to claim 1, further comprising an irradiation unit that irradiates ink ejected onto the surface of the recording medium with ultraviolet light, wherein the ink is a UV ink cured by the ultraviolet light.

14. A method for controlling an image forming apparatus capable of executing a single-sided recording mode in which an image is recorded on one side of a recording medium and a double-sided recording mode in which an image is recorded on both sides of the recording medium, the method comprising:

heating, using a first temperature adjustment device, the recording medium prior to ejecting ink onto a front surface of the recording medium;

ejecting ink onto the front surface of the recording medium;

reversing front and back surfaces of the recording medium by switching a conveying direction of the recording medium when the double-sided recording mode is executed; and heating, using a second temperature adjustment device, the recording medium after the front and back surfaces are reversed and prior to ejecting ink onto the back surface of the recording medium.

15. A non-transitory storage medium storing a control program for an image forming apparatus capable of executing a single-sided recording mode in which image recording is performed on one side of a recording medium and a double-sided recording mode in which image recording is performed on both sides of the recording medium, the control program, when executed by a computer of the image forming apparatus, causing the computer to perform processing comprising:

heating, using a first temperature adjustment device, the recording medium prior to ejecting ink onto a front surface of the recording medium;

ejecting ink onto the front surface of the recording medium;

reversing front and back surfaces of the recording medium by switching a conveying direction of the recording medium when the double-sided recording mode is executed; and heating, using a second temperature adjustment device, the recording medium after the front and back surfaces are reversed and prior to ejecting ink onto the back surface of the recording medium.

* * * * *